United States Patent
Yamaguchi

[11] Patent Number: 5,827,466
[45] Date of Patent: Oct. 27, 1998

[54] METHOD OF MOLDING GOLF BALLS USING AN INJECTION MOLD

[75] Inventor: Takehiko Yamaguchi, Chichibu, Japan

[73] Assignee: Bridgestone Sports Co., Ltd., Tokyo, Japan

[21] Appl. No.: 862,244

[22] Filed: May 23, 1997

[30] Foreign Application Priority Data

May 28, 1996 [JP] Japan ................................. 8-156092

[51] Int. Cl.⁶ ........................... B29C 45/14; B29C 45/27
[52] U.S. Cl. ................................. 264/279.1; 264/271.1; 264/328.8; 264/328.9; 264/296; 425/116; 425/117; 425/570; 425/573
[58] Field of Search ............................. 425/424, 432, 425/456, 577, 116, 572, 573, 117, 552, 570; 264/328.12, 271.1, 279.1, 328.8, 328.9, 328.16, 294, 296

[56] References Cited

U.S. PATENT DOCUMENTS

| | | | |
|---|---|---|---|
| 5,066,449 | 11/1991 | Kato et al. | 264/328.12 |
| 5,112,556 | 5/1992 | Miller | 425/589 |
| 5,122,046 | 6/1992 | Lavallee et al. | 425/577 |
| 5,147,657 | 9/1992 | Giza | 425/577 |
| 5,407,341 | 4/1995 | Endo et al. | 425/577 |
| 5,458,473 | 10/1995 | Banji | 425/577 |

FOREIGN PATENT DOCUMENTS 1-181538  7/1989  Japan ................................. 264/272.17

*Primary Examiner*—Khanh P. Nguyen
*Attorney, Agent, or Firm*—Sughrue, Mion, Zinn, Macpeak & Seas, PLLC

[57] ABSTRACT

A method of molding golf balls using an injection mold. The golf ball includes a plurality of dimples closely distributed on the surface of the ball. The injection mold for golf balls including a pair of separable mold segments (12, 12) defining a spherical cavity (22) when mated along a parting line (PL). A plurality of hollow tubular gates (20) are disposed in the surfaces of the mold segments to be mated along the parting line and in fluid communication with the cavity. Each gate (20) has a non-circular cross section at its outlet. Opposed portions (20-1, 20-2) of the gate cross section separated by the parting line (PL) have an equal area. A stock material is injected into the cavity through the gates to mold a golf ball.

16 Claims, 5 Drawing Sheets

METHOD OF MOLDING GOLF BALLS USING AN INJECTION MOLD

BACKGROUND OF THE INVENTION

1. Field of the Invention

This invention relates to an injection mold for the manufacture of golf balls and a method for preparing golf balls using the mold.

2. Prior Art

In general, golf balls are manufactured by injection molding a cover layer around a solid core or wound core. An injection mold comprising a pair of separable mold segments is often used. Referring to FIG. 3, a typical injection mold 10 is illustrated as comprising a pair of separable upper and lower mold segments 12, 12. The mold segments 12, 12 define a spherical cavity 22 when mated along a parting line PL. The mold 10 includes a main runner 14, an annular cold runner 16 connected to the main runner 14, extending along the parting line PL and circumscribing the cavity 22, a plurality of circumferentially equally spaced nozzles 18 extending radially inwardly from the annular cold runner 16, and a corresponding plurality of gates 20 extending from the nozzles 18 and opening to the cavity 22. With this construction, a golf ball is manufactured by placing a core 30 at the center of the mold cavity 22, and supplying a cover stock based on a thermoplastic resin to the annular cold runner 16 through the main runner 14, thereby injecting the cover stock into the cavity 22 from the runner 16 through the nozzles 18 and gates 20.

At the end of molding cycle, the upper mold segment is opened and the molded part is taken out of the mold. The molding material left in the runner 16 and nozzles 18 is also solidified at the same time as the cover stock is solidified in the cavity 22. As a result, when removed from the mold cavity, the molded part is in a Saturn-like form, that is, in the form of a gold ball 32 having integrally joined thereto a ring 36 and ribs 38 of solidified cover stock corresponding to the annular runner 16 and nozzles 18, respectively, as shown in FIG. 4. Thereafter, the ribs 38 are cut off, which step is known as a gate cutting step, and burrs left at the gate positions are trimmed off.

In the above-mentioned injection mold, the gates 20 disposed between the runner 16 and the cavity 22 are hollow tubes of circular cross-sectional shape which are provided by mating grooves of semicircular cross-sectional shape in the mold segments 12, 12. The outlet of the gates 20 where the gate 20 opens to the cavity 22 is positioned in the land of the golf ball where no dimples are formed in the ball surface. This is because if the outlet of the gates 20 is positioned at the dimples, it is impossible to trim off gate burrs. If the outlet of the gates 20 is positioned in close proximity to the dimple edge, fragments of trimmed burrs can fuse to the dimple edge, becoming defects. The outlet of the gates 20 must be positioned in the land area of the golf ball at a certain spacing from the dimple edge. Therefore, a prior art common practice is to position the outlet of the gates 20 in a relatively wide land area on the golf ball surface. For example, a phantom trimming line or band TL which does not intersect with the dimples (which is a great circle other than the parting line PL) is drawn on the ball surface as shown in FIG. 5, and the outlet of the gate 20 is located on this trimming line or band TL.

Since the recent trend is to distribute small dimples in a close arrangement, prior art molds often encounter difficulty in effectively molding golf balls.

It was found by recent studies that the higher the percent area occupation by dimples on the golf ball surface, he longer becomes the flight distance. See JP-A 09282/1988, for example. The current approach is to distribute small dimples on the golf ball surface in a close arrangement to thereby increase the percent area occupation by dimples. This leads to the tendency that the current golf balls have a smaller land area. This, in turn, inevitably requires the prior art mold mentioned above to restrict the position and size of gates or to reduce the number and cross-sectional area of gates.

Such restrictions give rise to several problems in manufacturing golf balls having small dimples closely distributed thereon. If gates 20 are positioned unequally along the circumference of a great circle corresponding to the parting line PL in order to distribute a predetermined number of gates having a predetermined cross-sectional area, then the balance of resin injection is disordered to cause off-centering of the core 30, failing to produce a uniform molded part. If the number or cross-sectional area of gates is reduced, then the resin is not effectively filled, resulting in molding defects. Furthermore, if the gate 20 is positioned off the parting line PL toward a space available side so that the gate cross-sectional areas associated with the mold segments 12, 12 are different from each other as shown in FIG. 6, then the balance of resin injection is disordered to cause off-centering of the core 30, resulting in molding defects.

Therefore, in order that golf balls be effectively molded by means of a prior art mold, the position and cross-sectional area of gates must be taken into account, which in turn, restricts the dimple arrangement of the golf ball. As a consequence, the recent demand for close distribution of small dimples is not always met. Inversely, when golf balls having small dimples closely distributed thereon are to be manufactured, difficulty often arises in effectively molding such balls using a prior art mold.

SUMMARY OF THE INVENTION

An object of the present invention is to provide an injection mold having modified gates such that even a golf ball having small dimples closely distributed thereon to provide an increased percent area occupation by dimples can be effectively injection molded without molding defects.

Another object is provide a method for preparing a golf ball using the mold.

The present invention provides an injection mold for golf balls comprising a pair of separable mold segments defining a spherical cavity when mated along a parting line. A plurality of hollow tubular gates are disposed in the surfaces of the mold segments to be mated along the parting line and in fluid communication with the cavity. A stock material is injected into the cavity through the gates to mold a golf ball. According to the invention, the gates are modified as follows. Gates having an outlet cross section of a suitable non-circular shape complying with the shape of a land of the golf ball are provided at desired positions. Then a necessary number of gates having a sufficient cross-sectional area can be provided in good balance even when it is desired to mold golf balls having small dimples closely distributed thereon. Additionally, opposed portions of the gate cross section separated by the parting line have an equal area. Then, even though the cross-sectional shape of the gate outlet is not circular, the molding material can be injected around the core in an evenly balanced manner without causing off-centering of the core. This ensures that golf balls of quality be effectively molded.

Accordingly, the present invention provides an injection mold for golf balls comprising a pair of separable mold segments defining a spherical cavity when mated along a parting line, and a plurality of hollow tubular gates being disposed in the surfaces of the mold segments to be mated along the parting line and in fluid communication with the cavity, wherein a stock material is injected into the cavity through the gates to mold a golf ball, characterized in that the gate has a non-circular cross section at least where it opens to the cavity, and the gate cross section is separated by the parting line into opposed portions of an equal area. Preferably, the opposed portions of the gate cross section separated by the parting line are congruent with each other.

The present invention also provides a method for preparing a golf ball using the injection mold defined above, comprising the step of injecting a stock material into the cavity of the mold through the gates having a non-circular cross section outlet to mold a golf ball.

BRIEF DESCRIPTION OF THE ACCOMPANYING DRAWINGS

The above and other objects, features and advantages of the invention will be more fully understood by reading the following description, taken in conjunction with the accompanying drawings.

DETAILED DESCRIPTION OF THE INVENTION

Figure 1A:
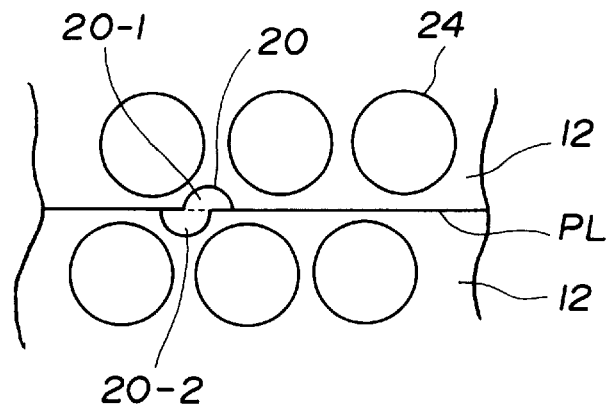
FIGS. 1A, 1B and 1C are fragmentary enlarged side views showing different cross-sectional shapes of a gate outlet disposed in mold segments of an injection mold according to the invention.
Figure 1B:
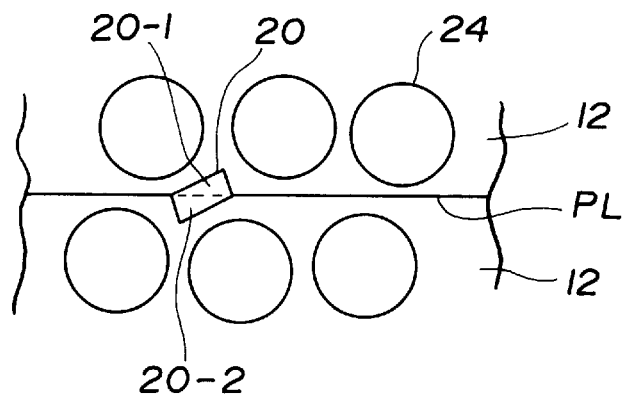
Figure 1C:
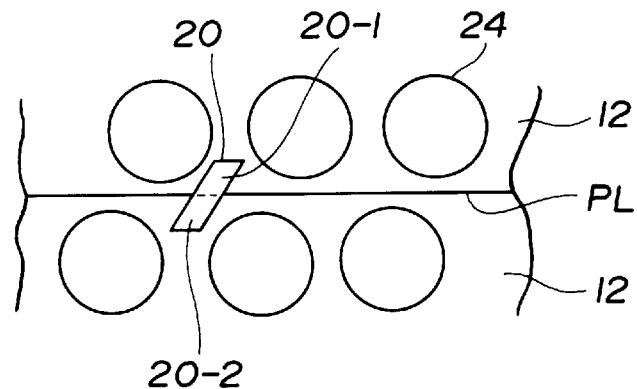

Referring to FIG. 1, there are illustrated mold segments of an injection mold according to the invention in which a gate 20 is disposed. More particularly, the outlet of the gate 20 where it opens to the mold cavity is shown in the cavity-defining surfaces of the mold segments 12, 12. The gate outlet has a non-circular shape. Different cross-sectional shapes of the gate outlet are shown in FIGS. 1A, 1B and 1C. The cavity-defining surface of each mold segment 12 has a negative dimple pattern, that is, dimple-forming protrusions 24 are arranged on the cavity-defining surface of the mold segment 12.

Figure 3A:
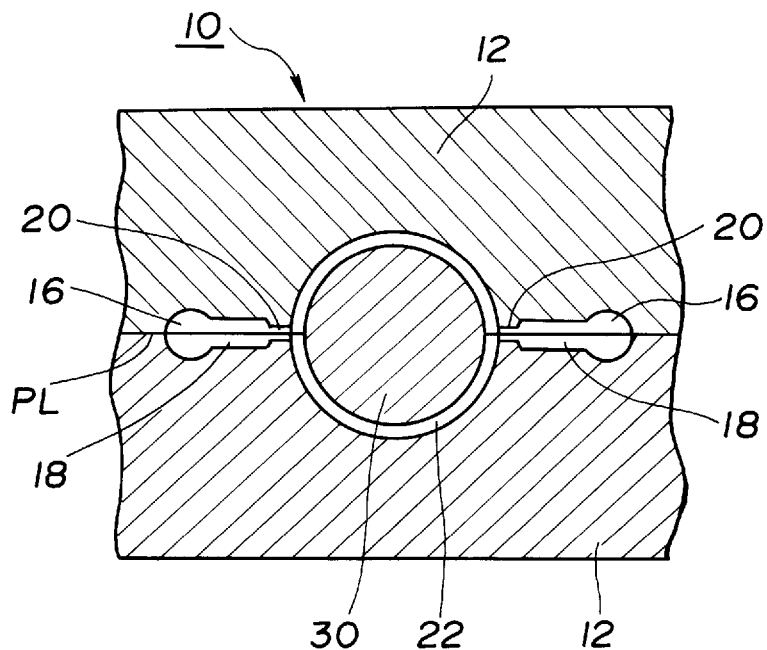
FIGS. 3A and 3B illustrate a typical injection mold for golf balls comprising a pair of mold segments, FIG. 3A being an elevational cross-sectional view and FIG. 3B being a plan view of the lower mold segment.
Figure 3B:
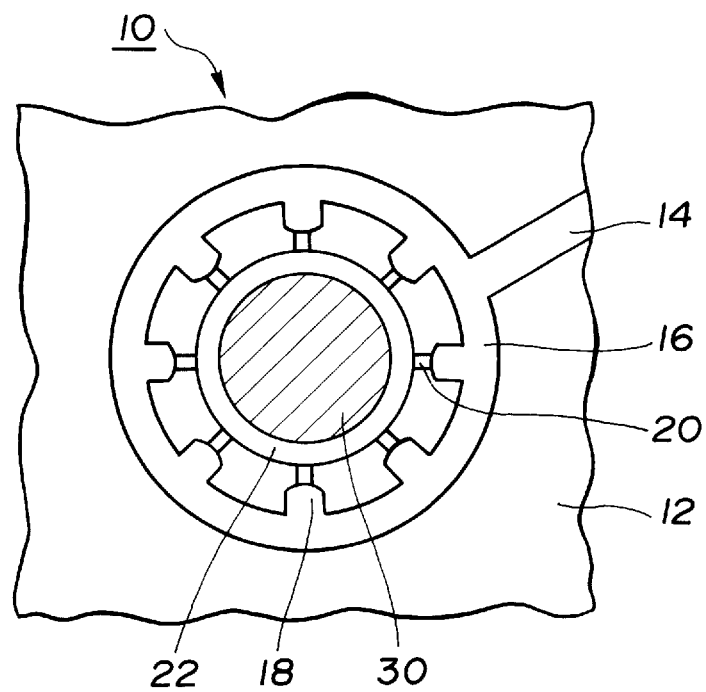

The basic overall structure of the mold is the same as the mold shown in FIG. 3. Briefly stated, the mold includes a pair of separable upper and lower mold segments 12, 12. The mold segments 12, 12 are provided with hemi-spherical recesses and in the opposed peripheral surfaces with a plurality of gate grooves. When the mold segments 12, 12 are mated together along the parting line PL, they define the spherical cavity 22 therein and at the same time, a plurality of hollow tubular gates 20 are defined in fluid communication with the cavity 22.

Figure 2A:
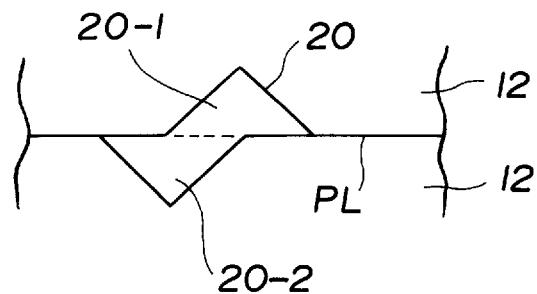
FIGS. 2A, 2B and 2C show different cross-sectional shapes of the gate outlet according to the invention.
Figure 2B:
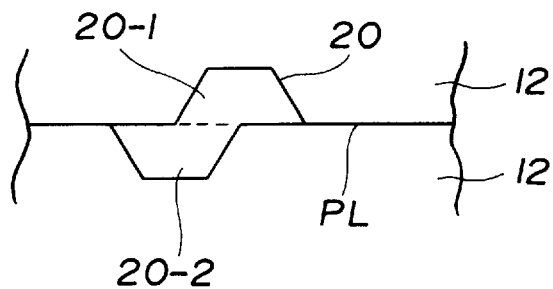
Figure 2C:
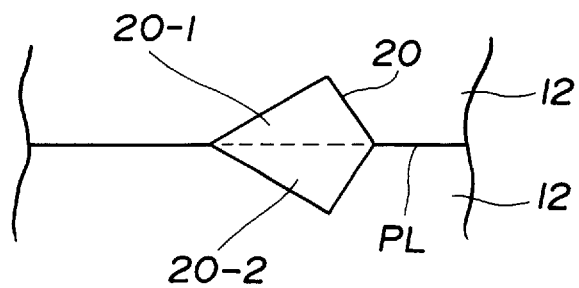

According to the invention, the gate 20 at its outlet where it opens to the cavity has a non-circular cross-sectional shape. FIG. 1A shows two semi-circular shapes joined with their centers offset along the parting line PL. FIGS. 1B and 1C show a parallelogramic gate outlet. The parallelogram shown in FIG. 1B is diagrammatically divided into two portions by the parting line PL. The parallelogram shown in FIG. 1C is divided into two portions by the parting line PL passing the intermediate points on a set of parallel sides. FIG. 2A shows two triangular shapes joined at the bottom in a staggered manner along the parting line PL. FIG. 2B shows two mesa shapes joined at the bottom in a staggered manner along the parting line PL. FIG. 2C shows two triangular shapes joined along the parting line PL with their bottom sides coincident. The gate outlet may take any desired shape other than circle. As shown in FIG. 1, the gate outlet can be formed to a desired cross-sectional area in accordance with the dimple arrangement and at a location where the land of the golf ball is situated.

As shown in FIGS. 1 and 2, the gate 20 is formed across the parting line PL between the upper and lower mold segments 12, 12. The parting line PL divides the gate 20 into two opposed portions 20-1 and 20-2 which should have an equal cross-sectional area. If the opposed portions 20-1 and 20-2 have different cross-sectional areas, then the resin injection balance between the upper and lower mold segments is disrupted, inviting inconvenience such as deviation of the core from the cavity center to inhibit accurate molding. As long the opposed portions 20-1 and 20-2 have an equal cross-sectional area, their shapes may be either identical or different from each other. It is preferred for resin injection balance that the opposed portions 20-1 and 20-2 be congruent with each other as shown in FIGS. 1 and 2.

If the gate 20 is located in close proximity to the dimple edge, fragments of trimmed burrs can fuse to the dimple edge, becoming defects. Therefore, the outlet of the gate 20 should preferably be positioned in the land area of the golf ball at a certain spacing from the dimple-forming protrusion 24. More particularly, the gate 20 is spaced a distance of about 0.05 to 3.0 mm, especially about 0.1 to 1.0 mm from the dimple-forming protrusion 24.

An appropriate cross-sectional area of the gate 20 to allow the molding resin to be injected therethrough is about 0.20 to 3.14 mm$^2$, especially about 0.35 to 1.50 mm$^2$ although the cross-sectional area of the gate 20 is properly determined in accordance with the dimple arrangement and the number of gates and not particularly limited. As mentioned above, one mold is provided with a plurality of gates. The respective gates may have different shapes although it is preferred for resin injection balance that all the gates have the same cross-sectional area.

The number of gates provided in the mold is properly determined in accordance with the dimple arrangement and the cross-sectional area of gates and not particularly limited although 4 to 20 gates, especially 6 to 12 gates are preferably provided for effectively injecting the molding resin. Also preferably the gates are equidistantly spaced along the parting line PL between the mold segments.

No particular limit is imposed on the construction of the mold other than the gates and the mold may have the same construction as prior art molds.

The mold of the invention wherein the gates 20 have a non-circular cross-sectional shape has the advantage that gates having a relatively large cross-sectional area can be provided outside the dimple areas even when it is desired to manufacture a golf ball having small dimples closely distributed thereon to provide an increased percent dimple area occupation. Relatively less restriction is imposed on the position where the gates are provided. A necessary number of gates 20 can be uniformly arranged in good balance. Since the opposed portions 20-1 and 20-2 of the gate 20 separated by the parting line PL have the same cross-sectional area despite the non-circular shape, the molding material can be injected into the cavity in good balance. Therefore, using the mold of the invention, even a golf ball having small dimples closely distributed thereon for an increased percent dimple area occupation can be effectively injection molded without molding defects.

Figure 4:
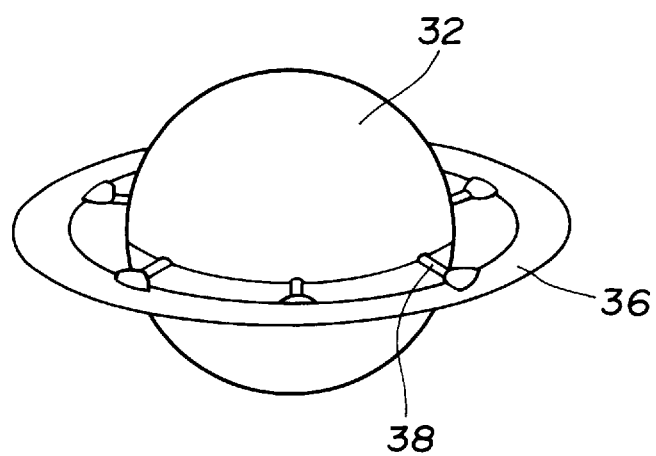
FIG. 4 is a perspective view of a golf ball as molded and removed from the mold of FIG. 3A.
Figure 5:
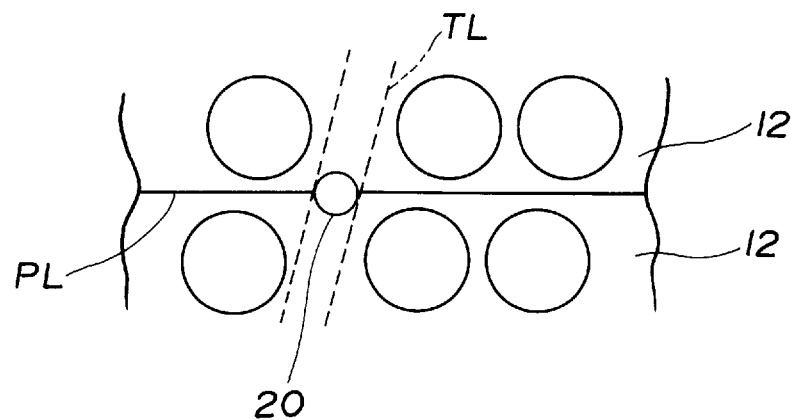
FIG. 5 illustrates one exemplary gate in a prior art injection mold.
Figure 6:
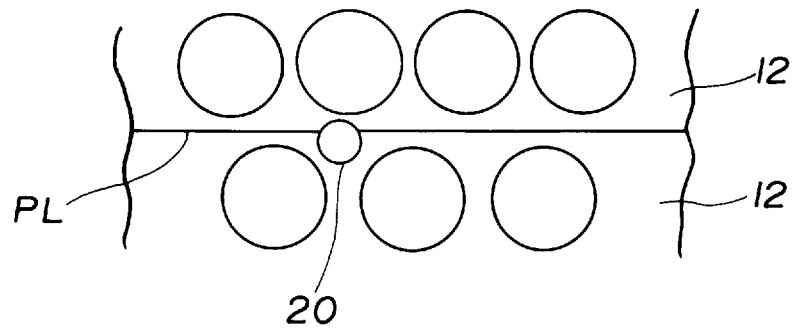
FIG. 6 illustrates another exemplary gate in a prior art injection mold.

In injection molding golf balls in the mold of the invention, the procedure and conditions may be the same as in prior art molds. For example, a two-piece solid golf ball having a cover injection molded over a solid core can be manufactured, for example, by placing the solid core 30 at the center of the cavity 22 as shown in FIG. 3, mating the upper and lower mold segments 12, 12 together to close the cavity 22, injection feeding a cover stock, typically ionomer resin compound in a molten state into the cavity 22 through the gates 20, cooling the cover stock for solidification, opening the upper mold segment 12, removing the molded part in the form shown in FIG. 4, cutting the gate ribs, and trimming off burrs. The mold of the invention is especially suited for molding such a cover layer of a two-piece golf ball. In addition, the mold of the invention is equally applicable to the manufacture of wound golf balls by injection molding a cover layer around a wound core and the manufacture of one-piece golf balls by injection molding.

The mold of the invention is not limited to the illustrated one of FIGS. 1 to 3. Proper modifications may be made on the shape of the gate 20 as well as the arrangement of the main runner 14, cold runner 16, and nozzle 18 without departing from the scope of the invention. It is also acceptable that the mold be provided with other well-known means such as a coolant channel for circulating coolant water.

There has been described an injection mold wherein gates have a non-circular cross-sectional shape at the outlet. A necessary number of gates having a sufficiently large cross-sectional area can be equidistantly provided in accordance with the dimple arrangement of a golf ball to be molded. A molding material can be effectively injected and fed into the cavity in a good balance, thereby injection molding a golf ball without defects. Even golf balls having small dimples closely distributed thereon for an increased percent dimple area occupation can be efficiently produced while the occurrence of molding defects is minimized.

The method for preparing a golf ball using the injection mold not only enables golf balls having a close distribution of small dimples for an increased percent dimple area occupation to be efficiently produced, but allows for free design of dimples without restrictions from the mold. The method ensures to manufacture golf balls of high performance.

Although some preferred embodiments have been described, many modifications and variations may be made thereto in the light of the above teachings. It is therefore to be understood that within the scope of the appended claims, the invention may be practiced otherwise than as specifically described.

I claim:

1. A method for preparing a golf ball having a plurality of dimples closely distributed thereon to provide an increased percent area occupied by dimples using an injection mold comprising the steps of: providing a pair of separable mold segments defining a spherical cavity when mated along a parting line, providing a plurality of hollow tubular gates disposed in the surfaces of the mold segments to be mated along the parting line and in fluid communication with the cavity, wherein the gate has a non-circular cross-section at least where it opens to the cavity, and the gate cross-section is separated by the parting line into opposed portion of an equal area, said gate being spaced a distance of about 0.05 to 3.0 mm from the dimple-forming protrusion and the cross-sectional area of said gate being about 0.20 to 3.14 mm$^2$; and injecting a stock material into the cavity through the gates to mold a golf ball.

2. A method for preparing a golf ball having a plurality of dimples closely distributed thereon to provide an increased percent area occupied by dimples using an injection mold comprising the steps of: providing a pair of separable mold segments defining a spherical cavity when mated along a parting line, providing a plurality of hollow tubular gates disposed in the surfaces of the mold segments to be mated along the parting line and in fluid communication with the cavity, wherein the gate has a non-circular cross-section at least where it opens to the cavity, and the gate cross-section is separated by the parting line into opposed portion of an equal area, the opposed portions of the gate cross-section separated by the parting line being congruent with each other, said gate being spaced a distance of about 0.05 to 3.0 mm from the dimple-forming protrusion and the cross-sectional area of said gate being about 0.20 to 3.14 mm$^2$; and injecting a stock material into the cavity through the gates to mold a golf ball.

3. The method for preparing a golf ball as defined by claim 1, wherein said gate is spaced a distance of about 0.1 to 1.0 mm from the dimple-forming protrusion.

4. The method for preparing a golf ball as defined by claim 1, wherein the cross-sectional area of said gate is about 0.35 to 1.50 mm$^2$.

5. The method for preparing a golf ball as defined by claim 1, further comprising the steps of providing 4 to 20 gates for effectively injecting said stock material.

6. The method for preparing a golf ball as defined by claim 5, further comprising the steps of providing 6 to 12 gates for effectively injecting said stock material.

7. The method for preparing a golf ball as defined by claim 1, wherein said gates are spaced equidistantly spaced along the parting line between the mold segments.

8. The method for preparing a golf ball as defined by claim 1, further comprising the steps of: placing a solid core at a center of the cavity; mating the pair of mold segments together to close the cavity; injecting a cover stock in a molten state into the cavity through the gates; cooling the cover stock for solidification; opening an upper portion of the mold segments; removing the molded golf ball; cutting ribs formed on the golf ball by the gates; and trimming off burrs formed on the golf ball.

9. The method for preparing a golf ball as defined by claim 1, wherein the non-circular cross-section of the gate is one of: parallelogram shaped portions; two semi-circular shaped portions joined with each center being offset along the parting line; triangular shaped portions joined in a staggered manner along the parting line; and two mesa shaped portions joined in a staggered manner along the parting line.

10. The method for preparing a golf ball as defined by claim 2, wherein said gate is spaced a distance of about 0.1 to 1.0 mm from the dimple-forming protrusion.

11. The method for preparing a golf ball as defined by claim 2, wherein the cross-sectional area of said gate is about 0.35 to 1.50 mm$^2$.

12. The method for preparing a golf ball as defined by claim 2, further comprising the steps of providing 4 to 20 gates for effectively injecting said stock material.

13. The method for preparing a golf ball as defined by claim 2, further comprising the steps of providing 6 to 12 gates for effectively injecting said stock material.

14. The method for preparing a golf ball as defined by claim 2, wherein said gates are spaced equidistantly spaced along the parting line between the mold segments.

15. The method for preparing a golf ball as defined by claim 2, further comprising the steps of: placing a solid core at a center of the cavity; mating the pair of mold segments together to close the cavity; injecting a cover stock in a molten state into the cavity through the gates; cooling the cover stock for solidification; opening an upper portion of the mold segments; removing the molded golf ball; cutting ribs formed on the golf ball by the gates; and trimming off burrs formed on the golf ball.

16. The method for preparing a golf ball as defined by claim 2, wherein the non-circular cross-section of the gate is one of: parallelogram shaped portions; two semi-circular shaped portions joined with each center being offset along the parting line; triangular shaped portions joined in a staggered manner along the parting line; and two mesa shaped portions joined in a staggered manner along the parting line.

\* \* \* \* \*